US012735965B2

(12) United States Patent
Gould

(10) Patent No.: US 12,735,965 B2
(45) Date of Patent: Sep. 15, 2026

(54) ENHANCED SOLVENT RECOVERY FROM TIGHT ROCK AND SHALE OIL WELLS

(71) Applicant: OIL TECHNOLOGY GROUP, LLC, Golden, CO (US)

(72) Inventor: Thomas Gould, Golden, CO (US)

(73) Assignee: Oil Technology Group LLC, Golden, CO (US)

( * ) Notice: Subject to any disclaimer, the term of this patent is extended or adjusted under 35 U.S.C. 154(b) by 0 days.

(21) Appl. No.: 19/037,253

(22) Filed: Jan. 26, 2025

(65) Prior Publication Data

US 2026/0218594 A1 Jul. 30, 2026

(51) Int. Cl.
*E21B 43/16* (2006.01)
*C09K 8/594* (2006.01)
*E21B 43/38* (2006.01)

(52) U.S. Cl.
CPC ............ *E21B 43/168* (2013.01); *C09K 8/594* (2013.01); *E21B 43/38* (2013.01)

(58) Field of Classification Search
None
See application file for complete search history.

(56) References Cited

U.S. PATENT DOCUMENTS

2011/0272152 A1* 11/2011 Kaminsky ............... E21B 43/30 166/268
2019/0002755 A1* 1/2019 Wang ..................... C09K 8/592
2021/0396111 A1* 12/2021 Azom ................. E21B 43/2408

* cited by examiner

*Primary Examiner* — Anuradha Ahuja
(74) *Attorney, Agent, or Firm* — SaraLynn Mandel

(57) ABSTRACT

The invention provides a method and system for displacing and recovering solvents and oil from at least one shale or extra tight rock well that has been previously treated with a cyclic liquid solvent enhanced oil recovery process. The method of the invention includes at least one cycle of injection of one or more selected, compressed, gaseous displacing agents into the well, during an injection period, to increase pressure in the stimulated reservoir volume to render the displacing agent miscible with banked solvent and oil remaining in the SRV of the well. The system of the invention performs the method of the invention and separates the solvent, displacing agent and oil from the miscible mixture produced from the stimulated reservoir volume of the well. This invention can be applied to all prior solvent treated wells.

12 Claims, 4 Drawing Sheets

ENHANCED SOLVENT RECOVERY FROM TIGHT ROCK AND SHALE OIL WELLS

FIELD OF THE INVENTION

The present invention relates to a method and system for enhanced solvent recovery by displacing and recovering liquid solvent remaining in an oil well after a completed cycle of injection and production periods.

BACKGROUND OF THE INVENTION

The process of induced hydraulic fracturing is used to recover oils from tight rock and shale oil wells in primary production. Induced fracturing causes an increased flow rate of oil by increasing the stimulated reservoir volume or "SRV". SRV represents the total volume of oil reservoir rock that has been hydraulically fractured in each stage of fracturing along a well's lateral length. The original volume of reservoir rock is termed the "matrix". SRV can be estimated from micro-seismic mapping data and is related to total injected-fluid volume and well performance of the combined fracture-matrix system. Computer simulation of well production data can be compared with actual field results to demonstrate variability in well performance and can be used to improve completion design, well spacing, and placement strategies. This is the reason for the concept of using SRV as a correlation parameter for well performance.

Field observations suggest that oil in the fracture stages does not flow back uniformly, with some flows stronger than others. In many cases, some of the fracture stages do not increase flow at all, and this is attributed to some form of formation damage to the matrix. Formation damage is a technical category of production engineering that can include many types of phenomena, ranging from mechanical to chemical blockage of flow. This means that the completion characteristics of the wells, the process of making a well ready for injection or production after drilling, will greatly control the timing and duration of the injection and production periods.

Cyclic liquid solvent enhanced oil recovery ("CLS-EOR") using injection of liquid solvent to recover additional oil remaining in the well, occurs after fracturing and some period of primary production from horizontal and vertical oil wells in shale and extra tight rock formations that have declined in production of oil. CLS-EOR uses the injection of a solvent or solvent mixture such as propane and butane, to assist in removing oil from rock inside the well. Because the low efficiency of primary production oil recovery leaves considerable amounts of oil in the reservoir, bound to the rock in these wells, various CLS-EOR methods have been developed, including methods of cyclic (repeated) processes, known as injection periods (commonly referred to as "Huff") to introduce gas or liquid solvent and production periods (commonly referred to as "Puff"), where oil and gas are produced. The CLS-EOR process involves alternating periods of injection of a liquid or gas solvent such as propane and butane, enriched gas, carbon dioxide, ethane, natural gas liquids (NGL), or Y-Grade into the oil well, followed by production of oil and gas from the same well. During an injection period, the solvent is injected into the well under pressure, which may be between 1000 and 9000 psi, until the pressure reaches a desired maximum in the oil reservoir to obtain miscibility of the solvent with the oil and cause the miscible mixture of oil and solvent to flow from the matrix through the induced fractures into the well. Typically, oil wells have a permitted maximum pressure.

The injection period is followed by the production period, where the oil is produced from the well as the pressure in the reservoir drops. Wells are produced until the oil production rate is low or the bottom pressure reaches the minimum. When pressure in the well declines to a specified minimum, another cycle of injection and production cycles commences. Timing of each injection and production period is variable and can range from days to weeks, to months, depending on a number of variables determined by the oil well rock properties, depth, temperature, oil fluid properties, completion type, lateral length of the well, number of fracturing stages, formation damage of stages, well grouping, containment, interference, and other characteristics. The timing of injection and production periods are determined and optimized using computer models of the specific well and reservoir combination of variables as known in the art.

After the CLS-EOR process is completed, a significant volume of the solvent is stored as a single-phase, miscible mixture of remaining oil and solvent in the well's SRV. Consequently, the solvents along with remaining mobile oil in the well's SRV may be referred to as being "banked" in the SRV. Approximately one barrel of solvent at reservoir conditions is stored in the oil well's SRV for each oil barrel previously produced by CLS-EOR.

A new, proprietary system and methods for performing CLS-EOR from shale and extra tight rock wells has been described, that uses a cyclic injection and production process of injecting liquid solvents into shale and extra tight oil wells. This is followed by producing, separating and then recycling the solvents in liquid phase, to produce additional oil after primary production (U.S. Pat. No. 11,280,170). Currently, recovery of injected solvent remaining in the well after CLS-EOR is limited by the decreased pressure in the well after the last production period.

Operators traditionally recover banked, injected solvent in a depressurizing process called "Blowdown". Blowdown is the process of intentionally depressurizing an oil reservoir to extract additional oil and injected solvent towards the end of a well reservoir's life, when cyclic EOR mechanisms are exhausted. Blowdown lowers the oil well pressure and thus limits solvent recovery, because the pressure needed to produce the remaining miscible mixture of banked solvent and associated oil has been depleted.

In general, injected solvents used to make the oil in the reservoir miscible for CLS-EOR recovery can be a wide range of liquids and gases including enriched gas, Y-grade, natural gas liquids or "NGLs," carbon dioxide, ethane, or propane-butane (C3-C4) solvent mixtures. Liquid and gas solvents used for the CLS-EOR process are very expensive to procure. Because banked solvent is not significantly recovered from the known CLS-EOR processes, there is a need for an economical and efficient method that increases the recovery of liquid and gas solvents after a CLS EOR process is performed on one or more wells, reducing the cost of obtaining solvents for reuse in wells in a new CLS-EOR project or for sale.

SUMMARY OF THE INVENTION

A summary of certain implementations of the invention described herein is set forth below. It should be understood that these aspects are presented merely to provide a brief summary of these certain implementations and that these aspects are not intended to limit the scope of this disclosure.

The method of the invention provides a novel solution to the problem of recovering solvent that remains in the reservoir of tight rock and shale oil wells after the performance of cyclic liquid solvent enhanced oil recovery. The method includes injection of compressed, gaseous displacing agents that forms a miscible mixture of the remaining oil and solvent in the reservoir and repressurizes the stimulated reservoir volume so that the miscible mixture flows out of the well into a surface collection system.

An implementation of the method of the invention for enhanced recovery of previously introduced liquid solvent in one or more oil wells following prior cyclic liquid solvent enhanced recovery of oil includes injecting during the injection period, into at least one oil well at least one compressed, gaseous displacing agent to increase pressure in the stimulated reservoir volume to an amount sufficient to form a miscible mixture of the injected displacing agent with the remaining oil and solvent in the stimulated reservoir volume and to induce the flow of miscible mixture from the well during the production period. The miscible mixture of solvent, displacing agent, oil, and dissolved field gas is produced from the well's SRV during the production period. The pressure in the well will have been increased during the injection period up to the maximum permitted pressure.

In another implementation of the method of the invention, the method includes separating a vapor mixture containing the solvent, field gas, and displacing agent from the produced miscible mixture of solvents, displacing agent, oil and dissolved field gas, and includes separating a liquid mixture containing the solvent, oil, and dissolved field gas from the produced miscible mixture of solvents, displacing agent, oil, and dissolved field gas. It also includes separating vapor containing field gas and solvent from the separated liquid mixture leaving liquid crude oil, storing the crude oil and removing vapor from the crude oil. All the separated vapor streams obtained are combined and compressed prior to liquid solvent recovery. The displacing agent is separated from the separated combined vapor and liquid solvent is recovered.

In still another implementation of the method of the invention, the recovered solvent is injected into at least one other well at an oil project site to perform CLS-EOR. Make-up solvent may be added to the recovered solvent for the injection periods.

In yet another implementation of the method of the invention, the recovered gaseous displacing agent is injected into at least one other well at an oil project site that has had a previous injection of liquid solvent for performing CLS-EOR. Make-up displacing agent may be added to the recovered gaseous displacing agent for the injection periods.

In another implementation of the method of the invention in multiple wells, the production period and the injection and production periods of groups of wells are staggered such that at least group of wells are injecting displacing agent during the injection period and at least one other group of wells are producing recovered displacing agent, solvent and oil.

In yet another implementation of the method of the invention, the displacing agent is selected from the group consisting of methane, dry gas, field gas, ethane, carbon dioxide, nitrogen, air and combinations of these agents.

In another implementation of the invention water is added to the displacing agent.

In still another implementation of the method of the invention, the injection and production periods are repeated in at least one oil well.

In yet another implementation of the method of the invention, a system for recovery of previously injected liquid solvents and remaining oil from an existing oil well using the method, includes a compressor component configured to inject displacing agent into the well at a predetermined pressure and rate during the injection period; and one or more separator and stabilizer components configured to separate solvent, oil, field gas and displacing agent from the production product. The system of the invention may include at least one storage container for production products and a component to recover vapor containing solvent and field gas from the stored, recovered oil.

The implementations, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

The features and advantages of the invention are apparent from the following description taken in conjunction with the accompanying drawings in which.

Figure 1:
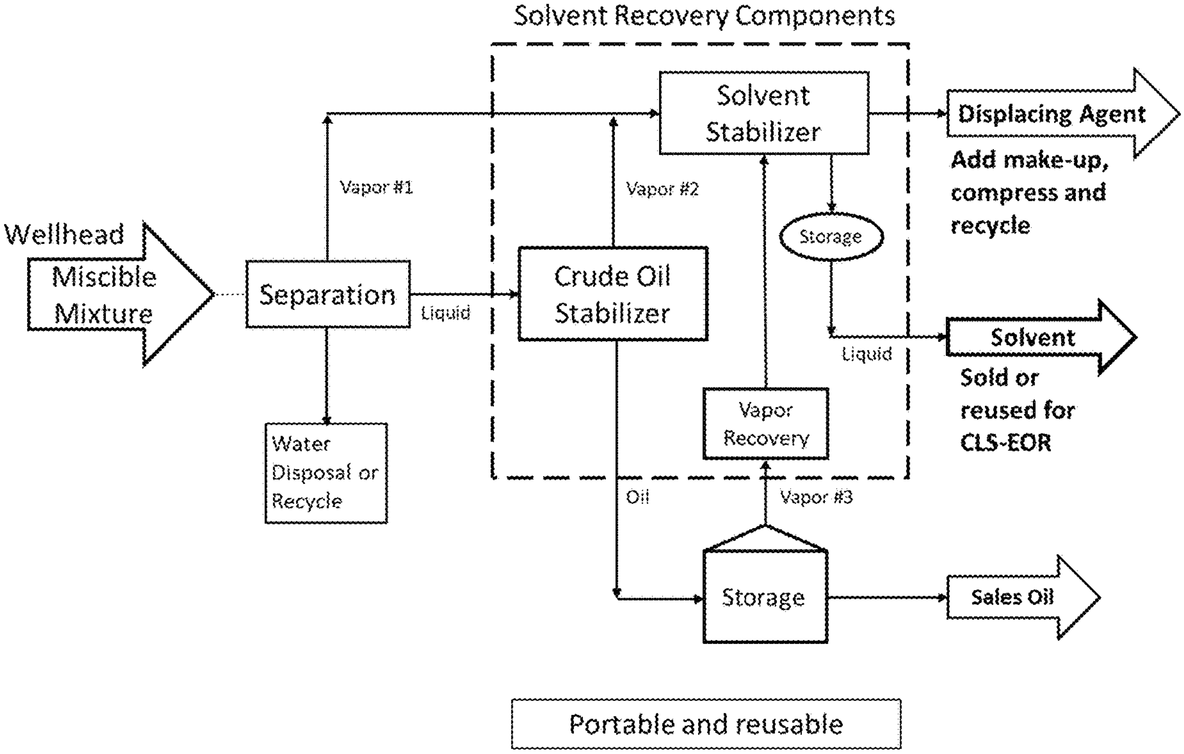
FIG. 1 depicts the components of an implementation of the system of the invention for using the method of the invention to enhance recovery of the banked liquid solvents previously injected into a well.

The figures have been presented to illustrate features of the present invention. The scope of the present invention is not limited to what is shown in the figures.

DETAILED DESCRIPTION OF THE INVENTION

Disclosed herein are methods and a system for enhanced oil recovery from tight rock or shale oil wells, after a prior, cyclic liquid solvent enhanced oil recovery ("CLS-EOR") process has been completed in which the injected solvent has mobilized oil off of the rock into a single phase, low viscosity, mixture of the solvents and previously unproduced, remaining oil in the reservoir void space within the well's Stimulated Reservoir Volume ("SRV"). The remaining solvent and mobilized oil mixture is referenced as being "banked in the SRV." The mixture in the SRV has not yet been produced due to the low pressure in the well that exists at the end of the prior CLS-EOR process, typically less than 1500 psi.

The method of the invention uses selected gaseous displacing agents to recover desired solvents and mobilized oil banked in the SRV of a shale or tight rock well, after at least one cycle of CLS-EOR treatment has been performed. When compressed and injected during a injection period, the selected displacing agent becomes miscible with the mixture of liquid solvent and remaining mobilized oil in the well. The pressure in the well's SRV will typically be lower than 1500 psi after completion of a final CLS-EOR cycle. As the pressure in the SRV is increased during the injection period of the method of the invention, the banked miscible mixture in the SRV matrix flows into the induced fractures, then into the wellbore, and then up to the surface during production periods. The invention also recovers remaining mobilized oil banked in the well during the production period.

The enhanced solvent recovery method of the invention may commence at any time following application of a prior CLS-EOR process on a well. The timing of use of the prior CLS-EOR process and the method of the invention can vary, taking into consideration economic optimization of results from performance of both the CLS-EOR process and the enhanced solvent recovery method of the invention.

The solvents recovered by the method of the invention from prior injection of the solvent in the CLS-EOR process, include, but are not limited to, enriched gas (a natural gas mixture that has been enhanced with heavier hydrocarbon solvents like ethane, propane, or butane), natural gas liquids ("NGLs") and Y-grade. NGLs include ethane, propane, butane and pentane. Y-grade is a mixed stream of liquid hydrocarbons, primarily consisting of ethane, propane, butanes, and natural gasoline, that are extracted from raw natural gas. Y-grade is essentially a blend of various NGLs before they are separated into individual purity products through a process called fractionation. The solvent may also include carbon dioxide, ethane, or a mixture of propane and butane (C3-C4).

The gaseous displacing agent selected for use in the method of the invention can be one or more of methane, dry gas, field gas, ethane, carbon dioxide, nitrogen, air, or economically viable gas that has the ability to form a miscible mixture under conditions existing in the SRV, allowing the banked solvent and mobilized oil to flow freely from the well. The type of displacing agent can be changed from time to time or cycle by cycle of injection, depending on existing conditions of the well, such as the pressure in the SRV after CLS-EOR. Selection of displacing agent also can be based on the availability and cost for obtaining the amount of displacing agent ("make-up volume") needed to replace the displacing agent that remains banked in the SRV, after a production period in the method of the invention, and for each successive injection and production cycle of the method of the invention. Water can also be mixed with the displacing agent to reduce cost, taking into consideration any reduced miscibility of the injected displacing agent with the mixture of liquid solvent and oil in the SRV. If a different type of displacing agent is used, for example a gaseous displacing agent is injected that is not the same as the previous displacing agent, after a cycle of injection and production, then the injected gaseous displacing agent will become a blend of two or more displacing agents and the blended total gas volume is compressed for injection. For example, if the make-up displacing agent in one cycle is changed from dry gas to carbon dioxide gas in the injection period, then a blend of these gases will be produced as the recovered displacing agent during the next production period.

In an implementation of the invention, an oil reservoir engineer or other experienced professional in oil recovery from shale and tight rock wells uses techniques well known in the art for injection and production in CLS-EOR, to apply the method of the invention and make adjustments as necessary for the condition of the well(s) to be treated for enhanced solvent recovery at a project site. Typically, the oil recovery professional will have obtained information from the operator, regarding the characteristics of the well and of the prior CLS-EOR project including, but not limited to the maximum permitted pressure for each well, typically in the range of approximately 1000 psi to approximately 9000 psi, the type and amount of solvent injected, the total number of CLS-EOR cycles performed, the amount of oil recovered, fluid properties of the oil recovered, physical properties of the reservoir rock and the type of completion of the well(s). In addition, details of the prior CLS-EOR project are reviewed such as the stages of fracturing that occurred, the status of any connections from the fracturing process to offset wells, commonly termed "frac hits," primary production history, volume of banked solvent and of banked mobilized oil in the SRV, observed injection and production volumes, and other details of the previous CLS-EOR project. Existing well conditions at the project site following completion of CLS-EOR for performing the method of the invention are also used. The information collected includes, but is not limited to, the existing temperature and pressure in the SRV, the volume of banked solvent, and composition of the miscible mixture remaining in the SRV.

In an implementation of the method of the invention, the information gathered in the observations from the performance of CLS-EOR and observed for the wells at the project site the enhanced solvent recovery method of the invention, are used to calibrate one or more computer models for the specific well(s) to be treated. The modelling provides operating parameters for applying the enhanced solvent recovery method of the invention. Oil Recovery Modelling software known in the gas and oil industry is used to assist in determining the existing conditions of the well(s), such as, but not limited to, Eclipse™ (SLB); GEM™ (Computer Modelling Group, Ltd.); VIP™ (Halliburton); tNavigator® (Rock Flow Dynamics, LLC). Conditions in the field at a project site may differ from the project design developed from computer modelling, and the engineer or other oil professional will make adjustments as needed.

The modelling provides parameters for performing the method of the invention, including, but not limited to, determining predicted maximum and minimum SRV pressures, volume of banked solvent recovery, volume of displacing agent for injection, injection cycle time and rate, production period timing and miscible mixture decline rate, compression discharge pressure and the target injection rate for the displacing agent from modeling for optimum cycle performance to recover solvent. Maximum pressure to be reached in the method of the invention in a well is defined by the rock-induced fracturing pressure which varies by depth, rock type, and location. Injection continues in an injection period until the desired volume or maximum pressure is reached during the injection period. For example, if the optimized gaseous displacing agent volume per cycle is 80 MMscf, and the optimized injection period is 10 days, then the injection rate is 8000 Mscf/d. This in turn defines the compression capacity and discharge pressure needed for the well. The computer model limits the volume or time duration of the injection period to stay within the maximum permitted well pressure. This will also allow the professional to select the type of displacing agent or combination of types of agents and amounts of agent for injection and rate of injection during injection periods sufficient to increase the post CLS-EOR lowered pressure in the SRV to render the selected displacing agent miscible with the mobilized oil and solvent remaining in the SRV for recovery of solvent.

A selected displacing agent may recover more desired solvent using the method of the invention than another displacing agent. However, less oil may be recovered than with use of another displacing agent. The volume and purchase price of recovered banked solvent and mobilized oil creates an economic trade-off relative to return on the capital investment for performing the method of the invention. Economic optimization may be used to assist in the determination of the preferred injected gaseous displacing agent(s) to use for the desired combination of solvent recovery and incremental oil. In addition, because local conditions, including availability of supply and cost of different displacing agents vary according to project site, adjustments may need to be made to the selection of displacing agent(s).

The selected displacing agent is compressed to a pressure below the maximum permitted well pressure and injected into the well or wells at a pre-determined rate during a pre-determined injection period from the results of modelling using the specifics of the well or wells. The injection rate is defined by a specified volume injected for the specific time period or injection until a pressure below the maximum allowed pressure of the well is reached. The total volume of displacing agent is compressed for injection in the range of from approximately 1000 psi to 9000 psi. The injection pressure will increase with time during the injection period, as a result of the repressuring of the SRV. After the amount of time predetermined by modelling for completion of injection, in view of the well conditions and determining the resulting increased pressure, the production period is commenced. The cycles of injection and production periods are repeated until the estimated maximum amount of solvent is recovered. The injection and production cycle periods may be varied and optimized to improve solvent recovery, and additional mobilized oil recovery, using the method and system of the invention. Economic optimization may indicate there is diminishing return on investment for continued injection and production cycles with low incremental solvent recovery per cycle. For example, if solvent recovery from wells at a project site using the method of the invention is 90% after 10 years, the economic optimum may suggest ending the process after 4 years, recovering 70% of the prior injected solvent, and moving the system of the invention to wells in a new project location. The increment recovery of solvent in a later year will be less than the recovery in the initial solvent recovery project using the method and system of the invention. This creates an economic incentive to move the system of the invention to another set of wells that have terminated the CLS-EOR process. Economic optimization includes placing the equipment of this invention on skids, so that it is reusable and moveable to a new project site is part of the invention thereby reducing capital expense.

In an implementation of the method of the invention, one or more compressed gaseous displacing agents are injected into one or more wells during the injection period to increase the pressure in the SRV to an amount sufficient to form a miscible mixture of the injected displacement agent with the remaining oil and solvent in the SRV. The pressure in the well will have been increased during the injection period in an amount not greater than the maximum permitted pressure. After completion of the injection period, the miscible mixture of solvents, displacing agent, oil and dissolved field gas (commonly termed solution gas) from the SRV is produced during the production period. Dissolved field gas is predominantly methane, but also contains a small quantity of solvents. After one or more cycles of injection and production periods, processing of the produced miscible mixture commences in the system of the invention. Processing includes, but is not limited to, separating a first vapor mixture containing the solvent, field gas, and displacing agent from the produced miscible mixture; and separating a liquid mixture containing the solvent, oil, and dissolved field gas from the produced miscible mixture. A second vapor mixture containing field gas and solvent is separated from the liquid mixture leaving liquid crude oil using stabilization. The crude oil is stored, and a third vapor stream is produced from the crude oil is removed. The three separated vapor streams containing solvent, field gas, and displacing agent are combined and compressed in preparation for liquid solvent recovery. The gaseous displacing agent is separated from the combined vapor streams leaving recovered liquid solvent.

The recovered solvent and recovered displacing agent may be used in multiple implementations of the invention. For example, the recovered solvent from one or more wells at a project site using the method of the invention may be injected into one or more wells at a different CLS-EOR project site, providing an economic benefit by reducing the cost of solvent for the project that must otherwise be purchased. Make-up solvent may be added as needed to the recovered solvent for the subsequent injections. In another example, recovered gaseous displacing agent obtained using the method of the invention may be recycled for use in the next injection and production cycle of the same well or in other wells at the same project site for additional solvent recovery. injected into one or more other wells that are undergoing enhanced solvent recovery using the method and system of the invention at the same project site or another project site. Make-up displacing agent may be added as needed to the recovered displacing agent to meet injection period requirements, including the injection rate for the subsequent injections.

The system of the invention includes equipment for the cycles of injection of displacing agent and production, as well as production of the miscible mixture from the SRV after application of the method of the invention. Stabilization components separate produced liquid solvent and displacing agent, from the produced vapor and liquid phases, respectively, using fractionation, cryogenic, compression, cooling, membrane separation and phase separation, as known in the art. The equipment may be conveniently housed as a contained combination of components, and may be made readily transportable, for example attached to skids. FIG. 1 depicts an implementation of the system consisting of a combination of components for separating and recovering solvent, displacing agent and oil from the production period in a well or wells treated with the method of the invention. As shown in FIG. 1, after a completed period of injection, production begins in the same well and processing of the produced mixture from the SRV proceeds using components of the system of the invention depicted in FIG. 1. The produced fluid from application of the method of the invention to a well, contains a miscible mixture of recovered solvent, displacing agent, mobilized oil, and field gas dissolved in the oil. The miscible mixture is first separated into vapor and liquid phases, as shown in FIG. 1, and the recovered solvent exists in both vapor and liquid phases. The vapor phase contains displacing agent, field gas, and solvent which are separated above ground using both separation and stabilization components in the system of the invention. The first vapor stream is separated from the produced miscible mixture using separator stages at successively lower pressure to maximize vapor recovery with pressures in the range of approximately 50 psi to approximately 300 psi. The liquid phase contains oil, dissolved field gas, and solvent that are separated above ground using stabilization components as shown in FIG. 1. Solvent and field gas is removed as a second vapor stream from the liquid, using an oil stabilizer, leaving the remaining oil at an elevated pressure. Stabilized oil is stored in a container at atmospheric pressure. A third vapor stream that contains additional solvent and field gas (methane dominated) is released from the stored oil as a result of reduction in pressure and is recovered using a vapor recovery component to reduce emissions. The three vapor streams are combined and compressed in preparation for liquid solvent recovery. The gaseous displacing agent is removed from the vapor and separated from the recovered liquid solvent by stabilization. The system may include one or more containers such as tanks appropriate to store the solvent, displacing agent and oil.

In an implementation of the invention for recovery of solvent from multiple groups of wells at a project site, where the wells have been previously subject to CLS-EOR injection and production, the wells are grouped so that one or more groups are producing while another group of wells is in the displacing agent injection period. A displacing agent is used during injection periods for a selected group of wells, for a specified time period, constant injection rate and injection pressure. Other well groups are producing solvent, oil, and gaseous displacing agent during production periods.

Figure 2:
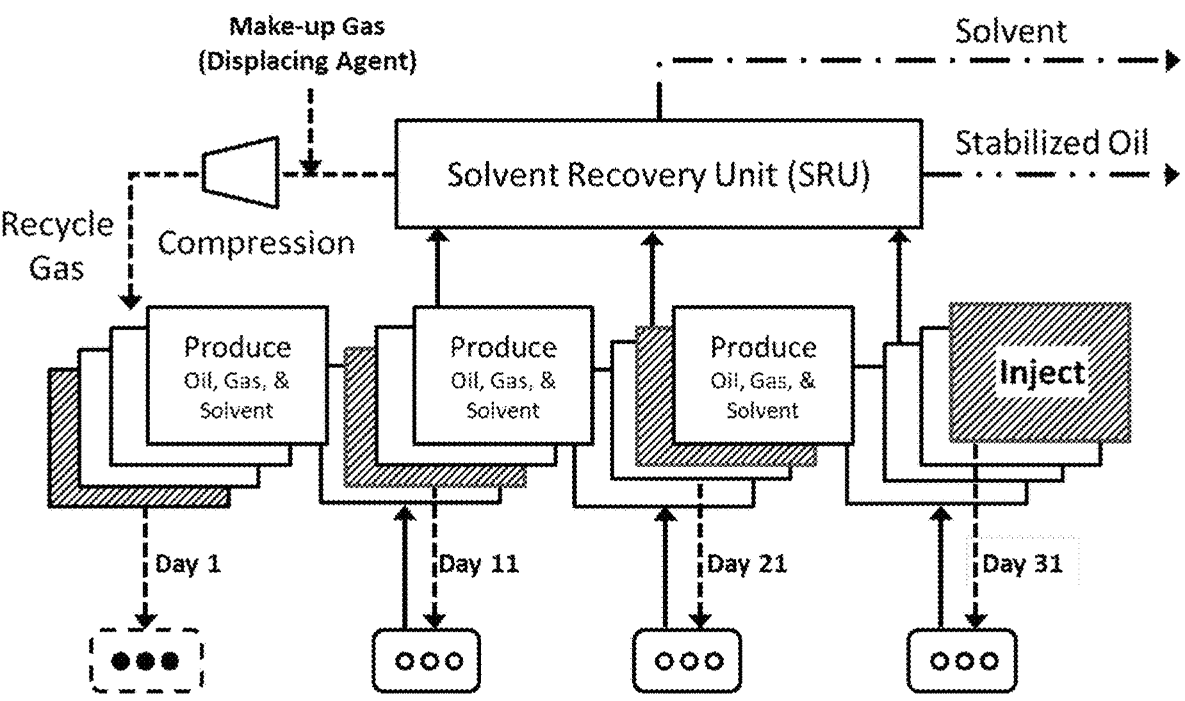
FIG. 2 depicts the performance of the method of the invention in groups of wells as described in Example II, infra.

FIG. 2 depicts injection and production periods of a group of wells that are sequenced for the injecting and producing groups of wells. The cycle times of wells in each well group have a longer production period with a shorter injection period, so that recycling of the displacing agent is optimized through use of the solvent recovery equipment in the system of the invention. Wells initially deliver high rates of solvent and displacing agent at the beginning of a production period, but the rate declines with declining pressure during the period. As production rate declines, it takes longer to reach the end of a production period as compared to the injection period that is constant rate. Wells are grouped so that a group of wells are in their production period when displacing agent is needed for the injection period in another group of wells at the site.

Containment of displacing agent injected into wells is necessary for sufficiently high pressure to be reached in the SRV during the injection period. Containment is evaluated from the calibrated computer modelling results and prior performance observations available to the oil engineer or other professional that are used to determine the grouping of wells. Wells are grouped such that the injected displacing agent is contained in the SRVs within the injected well group at higher injection pressure as compared to the producing groups at lower pressure. The need for both high- and low-pressure containment in the project area is a key factor in determining which wells are in each group. This is because, as stated above, previously induced hydraulic fracturing of any one stage along a well's lateral may have extended and hit an offset well as a frac hit, which results in connected common pressure. Although horizontal wells have many hydraulic fracture stages along the lateral length of the wells, the fractures do not all contribute equally, and some may be blocked by formation damage. Wells are grouped such that interaction or interference between wells in the injected group of wells allows the injected displacing agent to flow to all wells within the injected group of wells through the connected SRV between wells. The frac hits that connect one or more wells also allow the displacing agent to bypass stages blocked by formation damage. The result is additional solvent recovery from a blocked hydraulic fracture stage. Identifying connected wells is used in the designations of wells in groups in order to achieve and maintain pressure containment.

Injection and production period times and volumes for all groups of wells determine the sizing of the compression and solvent recovery stabilizer components. The number of wells per group, as well as the number of groups, may differ from the number of wells in the original CLS-EOR project due to conditions. If conditions in the field differ from the computer modelling it may alter the designation of the number of wells and the number of well groups. For example, in the method of the invention, the number of wells and number of groups may need to be reduced, if additional dedicated wells are needed for containment to preserve the pressure difference between groups of wells, and if the capacity of the system equipment to continue to operate for enhanced solvent recovery is limited. The number of well groups can vary from 2 to more depending on cycle injection and production time periods for the method of the invention.

Displacement agent will remain in the SRV, or in other wells at the same project site, or in wells at project sites at different locations that have had the method of the invention applied. In an implementation of the method where carbon dioxide gas is used as the displacing agent, the project may qualify for a Carbon Capture and Underground Storage (CCUS) project tax credit. Typically, carbon dioxide gas is separated for recycling from produced vapor, for example using membranes. Membranes commonly used for carbon dioxide gas separation may include but not be limited to, polymeric membranes such as poly(ethylene oxide) (PEO), cellulose acetate, polyamide, polysulfone, and polyether, as well as inorganic membranes such as silica, zeolite, and graphene, with the choice depending on the desired selectivity needed and intended application. At the completion of the enhanced solvent recovery project a large volume of carbon dioxide gas is permanently stored underground in the SRV of each well.

Recovered solvent from the application of the method of the invention for enhanced solvent recovery may be used to provide some or all of the solvent for use in CLS-EOR project wells or may be sold. In the case of a long-term development of a multi-well project, the method of the invention allows one initial investment in solvent for reuse in the CLS-EOR process multiple times in wells at reduced expense, if the initial banked solvent in the SRV is recovered for successive EOR projects. The additional CLS-EOR projects are "bootstrapped" using recovered solvent from application of the method of the well to one or more wells, resulting in reduced cost to purchase solvent.

The following examples are included to provide a more complete understanding of the invention, and do not limit the scope of the invention, which is limited only by the scope of the claims attached hereto.

Example 1 Enhanced Solvent Recovery from a Shale Oil Well Using the System and Method of the Invention with Dry Gas and Field Gas Displacing Agents In this example of an implementation of the method of the invention, the method is used on a well five years after a prior liquid solvent CLS-EOR process was performed using a mixture of C3 and C4 solvents in a shallow cool Eagle Ford shale oil well. At completion of the prior liquid solvent CLS-EOR project the reservoir void space within the SRV contains a miscible fluid consisting of injected solvent and remaining mobilized oil, at lowered pressure between approximately 500 psi to approximately 1500 psi. The reservoir engineer or other professional obtains the data for the well including the well characteristics prior to and after completion of the liquid solvent CLS-EOR process, the type and composition of the solvents used, the volume of solvent injected, and the volume of oil and solvent recovered for each cycle. The engineer or professional then calibrates a computer model with historical past primary oil recovery and liquid solvent CLS-EOR performance and selects a displacing agent. Computer modelling is then performed to determine the optimal initial injection volume and time period for the selected displacing agent. Two selected, compressed displacing agents consisting of Dry Gas having 94.7% methane and Field having 74.6% methane are evaluated in this example using modelling. In this example, the gas displacing agent is injected for 10 day periods and the well is produced for 30 day production periods. The same cycle periods are used as were used in the previously performed CLS-EOR process.

Using the method of the invention, the miscible mixture banked in the SRV consisting of remaining mobilized oil and solvents is repressurized by injecting into the well at a predetermined rate of injection. The injection period rate in this example is 8000 Mscf/d (thousand standard cubic feet/day) per well. The injection period starts at low pressure in the SRV, which is repressurized with the volume of displacing agent injected during the period. The displacing agent forms a miscible mixture with the banked mobilized oil and solvent in the SRV which is at an increased pressure. The production period will cause the miscible mixture in the SRV to flow from the reservoir. As pressure declines during the production period, methods of gas-lift or pumping are used to provide a relatively constant pressure in the well's lateral to sustain the flow during the production period.

Figure 3:
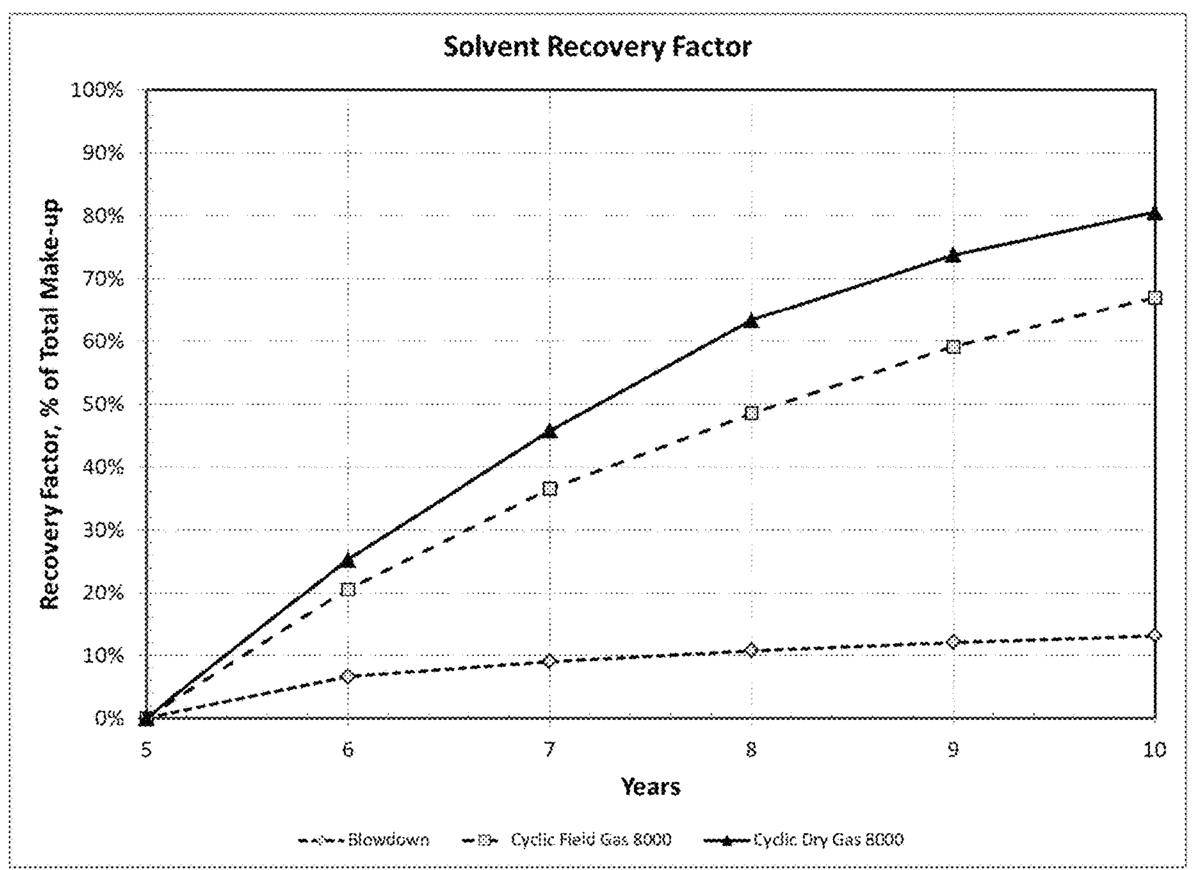
FIG. 3 depicts recovery of initial reservoir solvent from production in wells after injection periods using Dry gas and Field Gas as described in Example I, infra.

The amount of solvent remaining after 5 years of the original cyclic liquid C3-C4 EOR project in this Eagle Ford example is 459 Mstb (thousand stock tank barrels) per well. Where Dry Gas is used as the displacing agent, the method of the invention and system of the invention recovers 80.6% of solvents from the reservoir after 5 years, or 340 Mstb per well for injection of C3-C4 solvent. The recovery factor is depicted in FIG. 3 and is sensitive to injectivity. Lower injectivity results in less displacement of the banked miscible mixture in the SRV for a specified time limit and therefore less recovery factor.

Example 2 Solvent Recovery from Groups of Multiple Wells Using the System and Method of the Invention In an implementation of the method and system of the invention, wells are grouped so that wells in one group are producing in the production period while wells in another group are having displacing agent injected. The groups may contain different numbers of wells depending on injectivity, productivity, interference between wells, and injection and production time periods.

The example shown in FIG. 3 is for a 12 well enhanced solvent recovery project with four groups of three wells per group. Displacing agent injection starts every 10 days into a new group of wells. A manifold allows the compressor component in the system to run continuously. With 30-day production periods the invention requires 3 groups in order to operate the compressor continuously. Similarly, 20-day production periods would require 2 groups of wells.

The rate of recycling displacing agent is variable during the production periods of each group of wells. Therefore, the make-up rate for purchased displacing agent is variable during the injection period from nearly zero to nearly 8000 Mscf/d per well.

Figure 4:
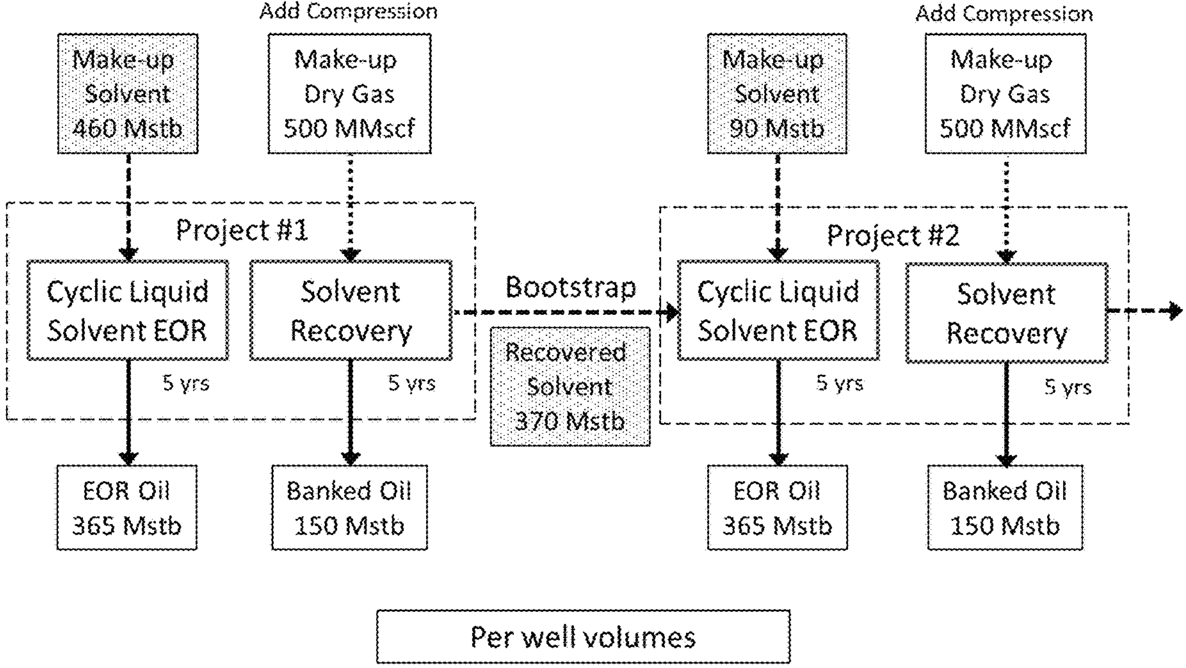
FIG. 4 depicts the benefit provided to an CLS-EOR project by cyclic injection of dry gas recovered from a previous CLS-EOR process on a well, as described in Example III.

Example 3: Use of the System and Method of the Invention to Reduce Solvent Costs for a Cyclic Solvent EOR Project Performed on a Shale Oil Well FIG. 4 shows the improvement in terms of EOR oil plus banked oil and make-up solvent needed by comparing a first cyclic liquid solvent EOR (CLS-EOR) project to a second liquid cyclic solvent EOR project of similar size, using the method and system of the invention on per well volumes in Example I. The first CLS-EOR project produces 365 Mstb of oil per well over 5 years. The make-up solvent volume purchase is 460 Mstb/well for miscible fluid displacement of the oil. The efficiency ratio for the first CLS-EOR project in this example is 1.26 barrel make-up solvent per barrel of oil in a typical well. The efficiency ratio multiplied by the primary production for each well and sum of the number of wells provides the total EOR oil recovery benefit of the first CLS-EOR project. However, a significant volume of banked mobilized oil and solvent remains in the reservoir after the first solvent EOR project.

As shown in FIG. 4, solvent recovery from using the method and system of the invention on completed wells in the first CLS-EOR project #1 using cyclic Dry gas as the displacing agent, is delivered to wells in a second CLS-EOR project #2, reducing the costs of make-up purchase of solvents for injection into the second CLS-EOR project. CLS-EOR Project #2 is bootstrapped by use of the recovered solvent obtained using the method of the invention. In this example, the recovered solvent volume is 370 Mstb/well which reduces the purchase cost for make-up solvent purchase for the second project to 90 Mstb/well for a typical well. The efficiency ratio for the second cyclic EOR project in this example is 0.25 barrel of make-up solvent per barrel of EOR oil in an average well. Depending on the cost charged for purchase of the solvent recovered and supplied from the use of the method and invention on the wells in the first project, the second project will have improved economic performance over the prior project.

In addition to solvent recovery, oil that was mobilized and banked from the prior CLS-EOR project is recovered using the method and system of the invention. In this example the amount of oil recovered is 150 Mstb/well for an average well, although each well will produce banked oil differently. The amount of banked oil produced is less than the CLS-EOR oil produced for a typical well. Multiplying the average 150 Mstb/well by the number of wells in the project provides the total banked oil recovery benefit.

Modifications and variations to the present invention may be practiced by those of ordinary skill in the art, without departing from the spirit and scope of the present invention, which is more particularly set forth in the appended claims. In addition, it should be understood the aspects of the various implementations may be interchanged both in whole or in part. Furthermore, those of ordinary skill in the art will appreciate that the foregoing description is by way of example only and is not intended to limit the invention further described in the appended claims.

All statements herein reciting principles, aspects, and implementations of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added implementations that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a combination of equipment which performs that function. Applicant thus regards any means which can provide those functionalities as equivalent to those shown herein.

When introducing elements of the present invention or the implementations thereof, the articles “a,” “an,” and “the” are intended to mean that there are one or more of the elements. Similarly, the adjective “another,” when used to introduce an element, is intended to mean one or more elements. The terms “including” and “having” are intended to be inclusive such that there may be additional elements other than the listed elements. The term “implementation” is not intended to be construed as a superlative example but merely one of many possible examples.

What is claimed is:

1. A method for enhanced recovery of liquid solvent remaining in a stimulated reservoir volume of a hydraulically fractured tight rock or shale oil reservoir following prior cyclic liquid solvent enhanced recovery (CLS-EOR) of oil, the solvent having been previously introduced during the CLS-EOR via one or more wells to mobilize the oil, the stimulated reservoir volume further comprising a portion of the mobilized oil, the method comprising:

a) injecting, during an injection period, via at least one well of the one or more wells, pressures from 1000 to 9000 psi, a compressed, gaseous displacing agent; and thereby (i) increasing pressure in the stimulated reservoir volume to form a miscible mixture of the injected gaseous displacing agent with the portion of the mobilized oil, the solvent, and dissolved field gas and (ii) inducing flow of the miscible mixture from the stimulated reservoir volume during a production period; and b) producing the miscible mixture from the stimulated reservoir volume via the at least one well during the production period.

2. The method of claim 1, further comprising:

c) separating a first vapor mixture from the produced miscible mixture, the first vapor mixture containing a vapor phase of each of the solvent, the dissolved field gas, and the gaseous displacing agent;

d) separating a first liquid mixture from the produced miscible mixture, the first liquid mixture containing a liquid phase of each of the solvent, the portion of the mobilized oil, and the dissolved field gas;

e) recovering a second vapor mixture from the first liquid mixture, the second vapor mixture containing a vapor phase of each of the dissolved field gas and the solvent, and thereby leaving a second liquid mixture containing liquid oil;

f) storing the liquid oil and recovering a third vapor mixture from the liquid oil; and g) combining the first, second and third vapor mixtures and compressing the combination to form a compressed vapor stream.

3. The method of claim 2, further comprising separating the gaseous displacing agent from the compressed vapor stream, and recovering the solvent as a liquid.

4. The method of claim 3, further comprising injecting the recovered solvent into at least one different well extending into the hydraulically fractured tight rock or shale reservoir to perform cyclic liquid solvent enhanced oil recovery.

5. The method of claim 4, wherein the injecting the recovered solvent further comprises adding make-up solvent to the recovered solvent.

6. The method of claim 3, further comprising injecting the gaseous displacing agent separated from the compressed vapor stream into at least one other well extending into the hydraulically fractured tight rock or shale reservoir during an injection period, wherein the at least one other well has had a previous injection of solvent during an injection period for cyclic liquid solvent enhanced oil recovery.

7. The method of claim 6, further comprising adding a make-up gaseous displacing agent to the gaseous displacing agent separated from the compressed vapor stream.

8. The method of claim 1, further comprising grouping a plurality of the one or more wells to provide at least one group of injection wells and at least one group of production wells, injecting the gaseous displacing agent during the injection period via the at least one group of injection wells and producing the miscible mixture during the production period via the at least one group of production wells.

9. The method of claim 1, wherein the gaseous displacing agent is selected from the group consisting of methane, dry gas, field gas, ethane, carbon dioxide, nitrogen, air and combinations thereof.

10. The method of claim 1, further comprising adding water to the gaseous displacing agent.

11. The method of claim 1, wherein the injecting and producing are repeated in the at least one well.

12. A system for performing the method of claim 1, the system comprising:

a) a compressor configured to inject the compressed, gaseous displacing agent into the at least one well at the pressures from 1000 to 9000 psi during the injection period; and b) one or more separators and stabilizers configured to separate the solvent, the portion of the mobilized oil, the dissolved field gas and the gaseous displacing agent of the miscible mixture produced via the at least one well during the production period.

* * * * *